United States Patent Office 3,654,306
Patented Apr. 4, 1972

3,654,306
5-AZASPIRO[2.4]HEPTANE-4,6-DIONES
Victor Frederick German, Richmond, Va., assignor to
A. H. Robins Company, Inc., Richmond, Va.
No Drawing. Filed Jan. 26, 1970, Ser. No. 5,904
Int. Cl. C07d 27/10
U.S. Cl. 260—326.5 FM          10 Claims

ABSTRACT OF THE DISCLOSURE 5-azaspiro[2.4]heptane-4,6-diones useful as diuretics and intermediates for 5-azaspiro[2.4]heptanes are described. The compounds are prepared by a series of reactions starting from dialkyl itaconates and itaconic anhydride with substituted diazomethanes.

---

The present invention relates to novel 5-azaspiro[2.4]heptane-4,6-diones. In particular, the invention relates to novel 5-azaspiro[2.4]heptane-4,6-diones which are substituted at the 1 and 5 position, processes of producing the same, intermediates useful in such processes, and to methods of making and using them.

According to the present invention, there are provided novel 1,1,5 - trisubstituted - 5 - azaspiro[2.4]diones of the formula:

Formula I

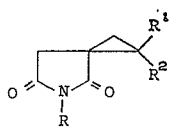

wherein R is hydrogen, lower alkyl, hydroxy-lower-alkyl, phenyl, phenyllower alkyl, lower-alkoxy phenyl, lower-alkyl phenyl, trifluoromethylphenyl and halophenyl; $R^1$ is phenyl, lower-alkoxy phenyl, lower-alkyl phenyl, trifluoromethylphenyl, and halophenyl; $R^2$ is hydrogen, phenyl, lower-alkoxy phenyl, lower-alkyl phenyl, trifluoromethylphenyl, halophenyl and novel intermediates useful in producing such compounds.

The compounds of the present invention of Formula I are useful as diuretics and as intermediates for novel 5-azaspiro[2.4]heptanes having anti-depressant activity. The latter compounds are disclosed in copending application Ser. No. 5896 filed on even date herewith.

A preferred group of compounds is represnted by Formula II:

Formula II

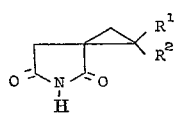

wherein $R^1$ and $R^2$ are as defined above.

It is, therefore, an object of the present invention to provide novel 5 - azaspiro[2.4]heptane - 4,6 - diones useful as diuretics. Another object is to provide novel 5 - azaspiro[2.4]heptane - 4,6 - diones which are useful as intermediates for the preparation of novel 5 - azaspiro[2.4]heptanes having anti-depressant activity. Additional objects will be apparent to those skilled in the art and still other objects will become apparent hereinafter.

The compounds falling within the general Formula I may exist in more than one form due to the possibility of stereoisomerism resulting from at least one center of asymmetry. It is also to be understood that the foregoing Formula I includes the possible racemates as well as the individual optically active forms.

In the definition of the symbols in the foregoing Formula I and where they appear elsewhere throughout the specification and claims thereof, the terms used herein have the following significance.

The term "lower alkyl" includes straight and branched chain radicals of up to eight carbon atoms inclusive and is exemplified by such groups as methyl, ethyl, propyl, isopropyl, butyl, isobutyl, tertiary butyl, amyl, isoamyl, hexyl, heptyl, octyl, and the like. The term "lower alkoxy" has the formula —O-lower alkyl.

When halogen is referred to herein, preferably but not necessarily, a halogen of atomic weight in excess of eighteen but not greater than eighty is employed.

Included in the term "phenyllower-alkyl" are groups such as benzyl, phenethyl, methylbenzyl, phenpropyl and the like.

The process of producing the 1,1,5 - trisubstituted - 5 - azaspiro[2.4]heptane-4,6-diones and novel intermediates is shown in Chart A. R, $R^1$ and $R^2$ are as defined above; $R^3$ is lower alkyl, preferably methyl; MZ is an alkali metal hydride or amide; and X is halogen.

CHART A

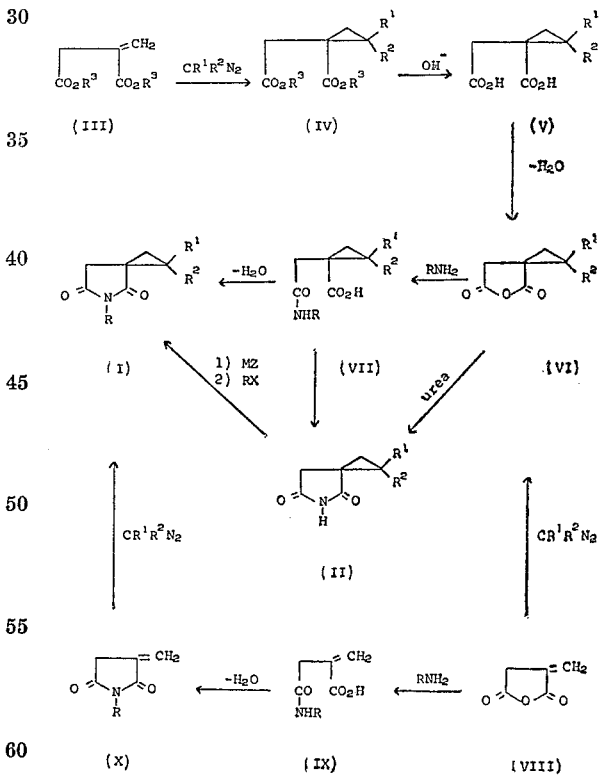

A dialkyl itaconate (III), preferably dimethyl itaconate, is reacted with substituted diazomethanes which are prepared by methods known in the art to give an alkyl 1 - carbalkoxymethylcyclopropylcarboxylate (IV). The reaction is generally carried out at or near room temperature for a period of from about three to about seven days in a solvent such as ether, ethyl acetate or the like. The diesters are isolated by evaporation of the solvent and the residual material which may be a liquid or a solid is purified by crystallization, distillation or column chromatography.

Representative of the compounds produced by the described reaction are:

methyl α-(1-carbomethoxy-2-(phenylcyclopropyl) acetate,
methyl α-(1-carbomethoxy-2,2-diphenylcyclopropyl) acetate,
methyl α-[1-carbomethoxy-2,2-di-(p-fluorophenyl) cyclopropyl]acetate,
methyl α-[1-carbomethoxy-2,2-di-(p-anisyl) cyclopropyl]acetate,
methyl α-[1-carbomethoxy-2,2-di-(p-tolyl) cyclopropyl]acetate,
methyl α-[1-carbomethoxy-2,2-di-(p-bromophenyl) cyclopropyl]acetate, and
methyl α-[1-carbomethoxy-2,2-di-(m-trifluoromethylphenyl)cyclopropyl]acetate.

The diester is hydrolyzed to the 1-carboxymethylcyclopropanecarboxylic acid (V), preferably in a basic alcoholic medium, illustratively ethanolic sodium hydroxide. The hydrolysis is carried out at reflux temperature for a period of from about four hours to about eight hours. The dibasic acid is isolated by acidifying the basic hydrolyzate, extraction of the product from the acidic mixture by a suitable solvent, illustratively ether, evaporation of the solvent and recrystallization of the solid residue.

The dibasic acid is cyclized by heating with a dehydrating agent as, for example, acetic anhydride, to the 5-oxaspiro[2.4]heptane-4,6-dione (VI). The latter compound is usually a crystalline solid which is readily purified by crystallization from a suitable solvent.

The cyclic dione is reacted with an alkyl or an aryl amine to give a 1-carbamoylmethylcyclopropanecarboxylic acid (VII). The preferential opening of the cyclic dione at the 5-6 position to give a 1-carbamoylmethylcyclopropanecarboxylic acid rather than an α-(1-carbamoyl)cyclopropane acetic acid has been shown by preparation of the latter by another method and by comparison of the physical data and the spectral data. The cyclic dione is added in portions to a stirred solution of the amine in an inert solvent such as benzene, ether, or the like. The addition is preferably carried out at or slightly below room temperature. After stirring at ambient temperature for a period of from about two to about twenty-four hours, the 1-carbamoylmethylcyclopropanecarboxylic acid is either collected by filtration of the reaction mixture or the solvent is evaporated from the reaction mixture leaving the product as a solid residue. Generally, an excess of the amine is used in the reaction and the excess is conveniently removed by slurrying the 1-carbamoylmethylcyclopropanecarboxylic acid in dilute mineral acid or by washing a chloroform solution of it with dilute mineral acid.

Representative of the 1-carbamoylmethylcyclopropanecarboxylic acids which are prepared in this way are:

2,2-diphenyl-1-[N-(m-trifluoromethylphenyl)carbamoyl] methylcyclopropanecarboxylic acid,
2,2-diphenyl-1-[N-(o-anisyl)carbamoyl]methylcyclopropanecarboxylic acid,
2,2-diphenyl-1-[N-(o-tolyl)carbamoyl]methylcyclopropanecarboxylic acid,
2,2-diphenyl-1-[N-(p-bromophenyl)carbamoyl]methylcyclopropanecarboxylic acid,
2,2-diphenyl-1-[N-(p-chlorophenyl)carbamoyl] methylcyclopropanecarboxylic acid,
2-(p-tolyl)carbamoylmethyl-1-phenylcyclopropanecarboxylic acid,
1-(N-ethyl)carbamoylmethyl-2,2-di-(p-anisyl) cyclopropanecarboxylic acid,
1-(N-ethyl)carbamoylmethyl-2,2-di-(p-tolyl) cyclopropanecarboxylic acid,
1-(N-methyl)carbamoylmethyl-2,2-di-(p-fluorophenyl) cyclopropanecarboxylic acid,
1-(N-methyl)carbamoylmethyl-2,2-di-(p-bromophenyl) cyclopropanecarboxylic acid, and
1-(N-methyl)carbamoylmethyl-2,2-di-(m-trifluoromethylphenyl)cyclopropanecarboxylic acid.

Cyclization of a 1-carbamoylmethylcyclopropanecarboxylic acid to a novel 5-azaspiro[2.4]heptane-4,6-dione (I) is effected in a suitable dehydrating medium. As a general method a 1-carbamoylmethylcyclopropanecarboxylic acid is dissolved in a weak base as, for example, pyridine, and the solution is treated with a dehydrating agent, illustratively acetic anhydride, at a temperature of from about 80° C. to about 110° C. for a period of from four to about twenty hours in a nitrogen atmosphere. The 5-azaspiro[2.4]heptane-4,6-dione thusly prepared is isolated by concentration of the reaction mixture, acid-base extraction of the crude residual amide, followed by crystallization from a suitable solvent or by purification by column chromatography using magnesium silicate.

Compounds of Formula II are of especial interest and can readily be prepared by cyclization of suitable 1-carbamoylmethylcyclopropanecarboxylic acids as described hereinabove. An alternate and preferred method is the fusion of a 5-oxaspiro[2.4]heptane-4,6-dione and urea under nitrogen at a temperature of from about 150° C. to about 180° C. for a period of from about one to about five hours. The 5-azaspiro[2.4]heptane-4,6-dione prepared in this manner is generally obtained in high yield.

The 5-azaspiro[2.4]heptane-4,6-dione prepared as described hereinabove is readily metallated using an alkali metal hydride or amide such as sodium hydride, lithium amide, sodium amide or lithium hydride. The reaction is effected by bringing the reactants together in an inert anhydrous liquid reaction medium such as benzene, xylene, toluene or tetralin. The reaction is preferably carried out at the reflux temperature of the selected solvent. The 5-metallo-5-azaspiro[2.4]heptane-4,6-dione thusly prepared is then reacted with a compound having a replaceable halogen atom to give a novel 5-azaspiro[2.4]heptane-4,6-dione.

Optionally, the novel 5-azaspiro[2.4]heptane-4,6-diones can be prepared by reaction sequence VIII→IX→X→I. An ethereal solution of itaconic anhydride (VIII) is allowed to react with an alkyl or an aryl amine to give an α-methylene succinamic acid (IX) which is subsequently dehydrated to a methylene succinimide (X). The reaction between itaconic anhydride and the selected amine is usually carried out at or below room temperature and is usually completed in a period of from about one to about three hours. It is usually not necessary to purify the α-methylene succinamic acid which is cyclized by mixing it with a dehydrating mixture as, for example, sodium acetate and acetic anhydride at room temperature. The pot temperature of the dehydrating mixture is usually raised to 50° C. to 60° C. for a short period of time to insure complete cyclization. The methylene succinimide is isolated by concentration of the dehydrating mixture, dissolving the crude residue in a suitable solvent, washing the solution with aqueous sodium bicarbonate solution followed by evaporation of the solvent. The residual oil is further purified by column chromatography or by crystallization from a suitable solvent.

The methylene succinimide is then reacted in an inert solvent, preferably ether, with a substituted diazomethane for a period of from about four to about six hours at room temperature to give a 5-azaspiro[2.4]heptane-4,6-dione. The dione which separates as a crystalline solid as it is formed is collected by filtration and recrystallized from a suitable solvent.

EXAMPLE 1

Methyl α-(1-carbomethoxy-2-phenylcyclopropyl)acetate

Dimethyl itaconate (11.85 g., 0.075 mole) was added to a filtered ethereal solution of crude phenyl diazomethane. After standing at room temperature for three days, the ether was evaporated at reduced pressure. The residual yellow oil was distilled at 123–128° C. (0.30 mm.); the yield was 4.0 g. (65%).

EXAMPLE 2

Methyl α-[1-carbomethoxy-2-phenyl-2-(3,4-dimethylphenyl)cyclopropyl]acetate

By the procedure of Example 1, methyl α-[1-carbomethoxy-2-phenyl-2-(3,4 - dimethylphenyl)cyclopropyl]acetate, M.P. 133–134° C. was prepared from dimethyl itaconate and phenyl-(3,4-dimethylphenyl)diazomethane.

EXAMPLE 3

Methyl α-[1-carbomethoxy-2-phenyl-2-(p-tolyl)cycloprop]acetate

By the procedure of Example 1, methyl α-[1-carbomethoxy-2-phenyl-2 - (p-tolyl)cyclopropyl]acetate, M.P. 140–143° C. was prepared from dimethyl itaconate and phenyl-(p-tolyl)diazomethane.

EXAMPLE 4

α-(1-carboxy-2-phenylcyclopropyl)acetic acid

A solution of methyl α-(1-carbomethoxy-2-phenylcyclopropyl)acetate in 50% ethanolic potassium hydroxide was refluxed six hours, the cooled mixture acidified with dilute hydrochloric acid and the acid mixture extracted with ether. The dried ether solution was concentrated to yield α-(1-carboxy - 2 - phenylcyclopropyl)acetic acid which melted at 101–193° C.

α-(1-carboxy-2-phenylcyclopropyl)acetic acid was also prepared by basic hydrolysis of 1-phenyl-4-oxaspiro[2.4]heptane-4,6-dione.

EXAMPLE 5

1-phenyl-5-oxaspiro[2.4]heptane-4,6-dione

A mixture of 7.0 g. (0.032 mole) of α-(1-carboxy-2-phenylcyclopropyl)acetic acid and 20 ml. of acetic anhydride was refluxed until the solution became homogeneous. The excess acetic anhydride was evaporated under reduced pressure to a yellow oil which solidified. The solid was crystallized from isopropyl ether to give 4.4 g. (70% yield) of product which melted at 131–135° C.

EXAMPLE 6

1,1-diphenyl-5-oxaspiro[2.4]heptane-4,6-dione

Itaconic anhydride (7.5 g., 0.0664 mole) was added in portions to an ether solution containing 12.2 g. (0.0664 mole) of crude diphenyldiazomethane. After the evolution of nitrogen ceased, the ether insoluble product was collected, washed with ether and air dried. The product weighed 16.6 g. (90% yield) and melted at 172–173° C.

EXAMPLE 7

2,2-diphenyl-1-(N-ethylcarbamoylmethyl)cyclopropanecarboxylic acid

To a stirred solution of 5.0 g. of ethylamine in 50 ml. of benzene was added 5.6 g. (0.02 mole) of 1,1-diphenyl-5-oxaspiro[2.4]heptane-4,6-dione. After standing overnight at room temperature, the solid ethylammonium salt was collected and dried. The dried salt was dissolved in water and the solution acidified with hydrochloric acid. The precipitated acid was extracted with chloroform, the chloroform evaporated and the residual solid crystallized from ethyl acetate-isooctane; the product melted at 209–211° C.

EXAMPLE 8

2,2-diphenyl-1-carbamoylmethylcyclopropanecarboxylic acid

By the procedure of Example 7, 2,2-diphenyl-1-carbamoylmethylcyclopropanecarboxylic acid, M.P. 195–198° C. was prepared from 1,1-diphenyl-5-oxaspiro[2.4]heptane-4,6-dione and aqueous ammonium hydroxide.

EXAMPLE 9

2-methylenesuccinanilide

Aniline (3.32 g.; 0.036 mole) was added dropwise to a stirred solution of 4 g. (0.036 mole) of itaconic anhydride in 30 ml. of ether; the reaction temperature was maintained at 5–10° C. After stirring the reaction mixture at the low temperature for an additional hour, petroleum ether was added. The 2-methylenesuccinanilide was collected and dried to give 6.0 g. (81.0% yield) of 2-methylenesuccinanilide.

EXAMPLE 10

N-phenyl-2-methylenesuccinimide

A mixture of 5.5 g. (0.027 mole) of 2-methylenesuccinanilide, 1.5 g. (0.018 mole) of sodium acetate and 50 ml. of acetic anhydride was stirred overnight at room temperature and then heated at 50° C. for a period of one hour. The reaction mixture was concentrated under reduced pressure, the residue was dissolved in chloroform and the chloroform solution was washed successively with ice water and sodium bicarbonate solution. After drying the solution over sodium sulfate the chloroform was evaporated, leaving a crude brown oil which was chromatographed on magnesium silicate. The product was eluted with 1% methanol in benzene. The benzene eluate was concentrated and the residual oil was crystallized from isooctane to give 2.0 g. (40% yield) of product which melted at 118.5–120° C.

EXAMPLE 11

1,1-diphenyl-5-azaspiro[2.4]heptane-4,6-dione

A mixture of 11.12 g. (0.04 mole) of 1,1-diphenyl-5-oxaspiro[2.4]heptane-4,6-dione and 2.8 g. (0.046 mole) of urea in a round bottomed flask was placed in a Wood's metal bath preheated to 150° C. The mixture was heated under nitrogen while the temperature of the bath was raised to 180° C. where it was maintained for three hours. The cooled reaction mixture was dissolved in boiling isopropanol, the insoluble material filtered off, and the filtrate allowed to stand overnight. The fine crystalline needles which formed were collected and dried to give 10 g. (89% yield) of product which melted at 240–243° C.

*Analysis.*—Calculated for $C_{18}H_{15}NO_2$ (percent): C, 77.96; H, 5.47; N, 5.05. Found (percent): C, 77.65; H, 5.48; N, 5.18.

EXAMPLE 12

5-benzyl-1,1-diphenyl-5-azaspiro[2.4]heptane-4,6-dione

Procedure A.—A mixture of 7.6 g. (0.02 mole) of 1-benzylcarbamoylmethyl-2,2-diphenylcyclopropane carboxylic acid and 50 ml. of pyridine was treated with 15 ml. of acetic anhydride and the mixture was heated at 90° C. for 16 hours. The crude residue which remained after concentration of the reaction mixture was acid-base extracted and then chromatographed on magnesium silicate. The product was eluted with chloroform and the chloroform evaporated leaving an oil which solidified and was crystallized from ethanol. The product weighed 3.5 g. (48% yield) and melted at 188–191° C.

*Analysis.*—Calculated for $C_{25}H_{21}NO_2$ (percent): C, 81.72; H, 5.76; N, 3.81. Found (percent): C, 81.50; H, 5.81; N, 3.82.

Procedure B.—1,1 - diphenyl-5-azaspiro[2.4]heptane-4,6-dione (2.7 g.; 0.01 mole), 0.39 g. (0.01 mole) of sodium amide and 100 ml. of dry benzene were combined and stirred at reflux until the evolution of ammonia ceased. The cooled mixture was treated with 3.67 g. (0.01 mole) of benzyl bromide and refluxing resumed for four hours. The cooled washed reaction mixture was concentrated and the residue chromatographed on magnesium silicate. The product was isolated as described in Procedure A and a mixture melting point of the products from the two procedures showed no depression.

EXAMPLE 13

1,1-diphenyl-5-methyl-5-azaspiro[2.4]heptane-4,6-dione

A mixture of 12 g. (0.036 mole) of 1-methylcarbamoylmethyl-2,2-diphenylcyclopropane carboxylic acid and 175 ml. of pyridine was treated with 15 ml. of acetic anhydride. The mixture was heated four hours under nitrogren at 100–110° C. and then concentrated at reduced pressure. The residue was crystallized from ethanol to give 7.8 g. (75% yield) of product which melted at 209.5–211.5° C.

EXAMPLE 14

1,1-diphenyl-5-(2-phenylethyl)-5-azaspiro[2.4]heptane-4,6-dione

Using the procedure of Example 3, 1,1-diphenyl-5-(2-phenylethyl) - 5 - azaspiro[2.4]heptane-4,6-dione, M.P. 132–135° C. was prepared in 85% yield from 1-phenylethylcarbamoylmethyl-2,2-diphenylcyclopropane carboxylic acid.

EXAMPLE 15

1,1,5-triphenyl-5-azaspiro[2.4]heptane-4,6-dione

Procedure A.—A mixture of 2.5 g. (0.007 mole) of 1-phenylcarbamoylmethyl - 2,2 - diphenylcyclopropane carboxylic acid, 1.0 g. (0.012 mole) of sodium acetate and 30 ml. of acetic anhydride was heated three hours at 100° C. The mixture was concentrated, and ether solution of the residue was acid-base extracted and the ether solution concentrated. The residue was crystallized from ethylacetate-isooctane to give 1.4 g. (61% yield) of product which melted at 188–190° C.

*Analysis.*—Calculated for $C_{24}H_{19}NO_2$ (percent): C, 81.56; H, 5.42; N, 3.96. Found (percent): C, 81.28; H, 5.36; N, 3.99.

Procedure B.—An ether solution of 1.6 g. (0.0085 mole) of N-phenyl-2-methylenesuccinimide was combined with an ether solution of diphenyldiazomethane. After standing four hours at room temperature, the separated 1,1,5-triphenyl-5-azaspiro[2.4]heptane - 4,6 - dione was collected and washed with petroleum ether. The solid was crystallized from ethyl acetate isooctane to give 1.95 g. (64% yield) of product which melted at 188–190° C.

EXAMPLE 16

1,1-diphenyl-5-ethyl-5-azaspiro[2.4]heptane-4,6-dione

Ten grams of 1-ethylcarbamoylmethyl - 2,2 - diphenylcyclopropane carboxylic acid, 100 ml. of pyridine and 20 ml. of acetic anhydride were combined and the mixture heated overnight at 85–95° C. The reaction mixture was concentrated and a chloroform solution of the residue was washed successively with dilute hydrochloric acid, dilute sodium hydroxide and water. The chloroform solution was dried, the chloroform evaporated, and the residue crystallized from ethyl acetate-isooctane to give 9 g. (63% yield) of product which melted at 150–152° C.

*Analysis.*—Calculated for $C_{20}H_{18}NO_2$ (percent): C, 78.66; H, 6.27; N, 4.81. Found (percent): C, 78.82; H, 6.29; N, 4.57.

EXAMPLE 17

1-phenyl-1-(p-anisyl)-5-azaspiro[2.4]heptane-4,6-dione

Using the procedure of Example 1, 1-phenyl-1-(p-anisyl)-5-oxaspiro[2.4]heptane-4,6-dione was reacted with urea to give 1-phenyl-1-(p-anisyl) - 5 - azaspiro[2.4]heptane-4,6-dione which melted at 229–232° C.

*Analysis.*—Calculated for $C_{19}H_{17}NO_3$ (percent): C, 74.25; H, 5.57; N, 4.56. Found (percent): C, 74.27; H, 5.71; N, 4.57.

EXAMPLE 18

1-phenyl-1-(p-tolyl)-5-azaspiro[2.4]heptane-4,6-dione

Using the procedure of Example 1, 1-phenyl-1-(p-tolyl)-5-oxaspiro[2.4]heptane-4,6-dione was reacted with urea to give 1-phenyl-1-(p-tolyl)-5-azaspiro[2.4]heptane-4,6-dione which melted at 213–218° C.

EXAMPLE 19

By the procedure of Example 3 using, in place of 1-methylcarbamoyl-methyl-2,2 - diphenylcyclopropane carboxylic acid, the following:
1-ethylcarbamoylmethyl-2-phenylcyclopropane carboxylic acid,
1-(2-hydroxyethyl)carbamoylmethyl-2-phenylcyclopropane carboxylic acid,
1-(m-trifluoromethylphenyl)carbamoylmethyl-2,2-diphenylcyclopropane carboxylic acid,
1-(o-anisyl)carbamoylmethyl-2,2-diphenylcyclopropane carboxylic acid,
1-(o-tolyl)carbamoylmethyl-2,2-diphenylcyclopropane carboxylic acid,
1-(p-bromophenyl)carbamoylmethyl-2,2-diphenylcyclopropane carboxylic acid,
1-(p-chlorophenyl)carbamoylmethyl-2,2-diphenylcyclopropane carboxylic acid,
1-phenylcarbamoylmethyl-2-(p-anisyl)cyclopropane carboxylic acid,
1-phenylcarbamoylmethyl-2-(p-tolyl)cyclopropane carboxylic acid,
1-ethylcarbamoylmethyl-2,2-di-(p-anisyl)cyclopropane carboxylic acid,
1-ethylcarbamoylmethyl-2,2-di-(p-tolyl)cyclopropane carboxylic acid,
1-methylcarbamoylmethyl-2,2-di-(p-fluorophenyl)cyclopropane carboxylic acid,
1-methylcarbamoylmethyl-2,2-di-(p-bromophenyl)cyclopropane carboxylic, and
1-methylcarbamoylmethyl-2,2-di-(m-trifluoromethylphenyl)cyclopropane carboxylic acid, the products are, respectively:

5-ethyl-1-phenyl-5-azaspiro[2.4]heptane-4,6-dione,
5-(2-hydroxyethyl)-1-phenyl-5-azaspiro[2.4]heptane-4,6-dione,
1,1-diphenyl-5-(m-trifluoromethylphenyl)-5-azaspiro[2.4]heptane-4,6-dione,
5-(o-anisyl)-1,1-diphenyl-5-azaspiro[2.4]heptane-4,6-dione,
1,1-diphenyl-5-(o-tolyl)-5-azaspiro[2.4]heptane-4,6-dione,
5-(p-bromophenyl)-1,1-diphenyl-5-azaspiro[2.4]heptane-4,6-dione,
5-(p-chlorophenyl)-1,1-diphenyl-5-azaspiro[2.4]heptane-4,6-dione,
1-(p-anisyl)-5-phenyl-5-azaspiro[2.4]heptane-4,6-dione,
5-phenyl-1-(p-tolyl)-5-azaspiro[2.4]heptane-4,6-dione,
1,1-di-(p-anisyl)-5-ethyl-5-azaspiro[2.4]heptane-4,6-dione,
5-ethyl-1,1-di-(p-tolyl)-5-azaspiro[2.4]heptane-4,6-dione,
1,1-di-(p-fluorophenyl)-5-methyl-5-azaspiro[2.4]heptane-4,6-dione,
1,1-di-(p-bromophenyl)-5-methyl-5-azaspiro[2.4]heptane-4,6-dione, and
1,1 - di - (m - trifluoromethylphenyl)-5-methyl-5-azaspiro[2.4]heptane-4,6-dione.

What is claimed is:
1. A compound selected from 5-azaspiro[2.4]heptane-4,6-diones having the formula:

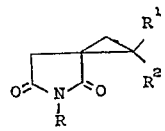

wherein;
R is selected from the group consisting of hydrogen, lower alkyl, 2-hydroxyethyl, phenyllower alkyl, phenyl, lower-alkoxy phenyl, lower-alkyl phenyl, trifluoromethylphenyl and halophenyl, $R^1$ is selected from the group consisting of phenyl, lower-alkoxy phenyl, lower-alkyl phenyl, trifluoromethylphenyl and halophenyl, and $R^2$ is selected from the group consisting of hydrogen, phenyl, lower-alkyl phenyl, lower-alkoxy phenyl, trifluoromethylphenyl and halophenyl.

2. A compound of claim 1 which is 1,1-diphenyl-5-azaspiro[2.4]heptane-4,6-dione.

3. A compound of claim 1 which is 5-benzyl-1,1-diphenyl-5-azaspiro[2.4]heptane-4,6-dione.

4. A compound of claim 1 which is 1,1-diphenyl-5-methyl-5-azaspiro[2.4]heptane-4,6-dione.

5. A compound of claim 1 which is 1,1-diphenyl-5-(2-phenyl-ethyl)-5-azaspiro[2.4]heptane-4,6-dione.

6. A compound of claim 1 is 1,1,5-triphenyl-5-azaspiro[2.4]heptane-4,6-dione.

7. A compound of claim 1 which is 1,1-diphenyl-5-ethyl-5-azaspiro[2.4]heptane-4,6-dione.

8. A compound of claim 1 which is 1-phenyl-1-(p-anisyl)-5-azaspiro[2.4]heptane-4,6-dione.

9. A compound of claim 1 which is 1-phenyl-1-(p-tolyl)-5-azaspiro[2.4]heptane-4,6-dione.

10. A process for the preparation of 5-azaspiro[2.4]heptane-4,6-diones having the formula:

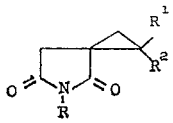

wherein;

R is selected from the group consisting of hydrogen, loweralkyl, 2-hydroxyethyl, phenyl, phenyllower alkyl, lower-alkoxy phenyl, lower-alkyl phenyl, trifluoromethylphenyl, and halophenyl, $R^1$ is selected from the group consisting of phenyl, lower-alkoxy phenyl, lower-alkyl phenyl, trifluoromethylphenyl, and halophenyl, and $R^2$ is selected from the group consisting of hydrogen, phenyl, lower-alkoxy phenyl, lower-alkyl phenyl, trifluoromethylphenyl and halophenyl, which comprises the steps of:

(1) treating a dialkyl itaconate wherein the alkyl groups have one to two carbon atoms with a substituted diazomethane;

(2) saponifying the alkyl 1-carbalkoxymethylcyclopropanecarboxylate prepared in step (1) in a basic alcoholic medium;

(3) cyclizing the 1 - carboxymethylcyclopropanecarboxylic acid from step (2) by heating the acid in a dehydrating medium;

(4) opening the cyclic 5-oxaspiro[2.4]heptane-4,6-dione from step (3) by reacting with a lower-alkylamine, phenyllower-alkylamine; aniline or a monosubstituted aniline, and (5) cyclizing the 1-carbamoylmethylcyclopropanecarboxylic acid from step (4) by heating in a dehydrating medium at 80° C. to 110° C.

References Cited
UNITED STATES PATENTS 3,432,499   3/1969   Rice et al. _____ 260—247.5

ALEX MAZEL, Primary Examiner

J. A. NARCAVAGE, Assistant Examiner

U.S. Cl. X.R.

260—346.1 R; 468 P, 514 P

UNITED STATES PATENT OFFICE
CERTIFICATE OF CORRECTION

Patent No. 3,654,306      Dated Apr. 4, 1972

Inventor(s) Victor Frederick German

It is certified that error appears in the above-identified patent and that said Letters Patent are hereby corrected as shown below:

Column 7, line 64, change "Example 1" to read --Example 11--; line 74, change "Example 1" to read --Example 11--.

Column 8, line 5, change "Example 3" to read --Example 13--

Signed and sealed this 19th day of September 1972.

(SEAL)
Attest:

EDWARD M. FLETCHER, JR.      ROBERT GOTTSCHALK
Attesting Officer      Commissioner of Patents